United States Patent
Zheng

(10) Patent No.: US 9,201,760 B2
(45) Date of Patent: *Dec. 1, 2015

(54) METHOD AND SYSTEM FOR IDENTIFYING ERRORS IN CODE

(71) Applicant: SALESFORCE.COM, INC., San Francisco, CA (US)

(72) Inventor: Zuye Zheng, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/969,246

(22) Filed: Aug. 16, 2013

(65) Prior Publication Data
US 2013/0339799 A1    Dec. 19, 2013

Related U.S. Application Data

(63) Continuation of application No. 13/105,849, filed on May 11, 2011, now Pat. No. 8,549,359.

(60) Provisional application No. 61/395,407, filed on May 12, 2010.

(51) Int. Cl.
*G06F 11/00* (2006.01)
*G06F 11/36* (2006.01)

(52) U.S. Cl.
CPC .......... *G06F 11/362* (2013.01); *G06F 11/3612* (2013.01)

(58) Field of Classification Search
USPC ....................................... 714/38.11
See application file for complete search history.

(56) References Cited

U.S. PATENT DOCUMENTS

| | | | | |
|---|---|---|---|---|
| 6,009,269 | A * | 12/1999 | Burrows et al. | 717/130 |
| 7,305,454 | B2 * | 12/2007 | Reese et al. | 709/217 |
| 7,516,191 | B2 * | 4/2009 | Brouk et al. | 709/217 |
| 7,590,685 | B2 * | 9/2009 | Palmeri et al. | 709/203 |
| 7,689,711 | B2 * | 3/2010 | Brouk et al. | 709/238 |
| 7,721,328 | B2 * | 5/2010 | Boulos et al. | 726/6 |
| 7,725,605 | B2 * | 5/2010 | Palmeri et al. | 709/246 |
| 7,739,351 | B2 * | 6/2010 | Shkvarchuk et al. | 709/217 |
| 7,788,399 | B2 * | 8/2010 | Brouk et al. | 709/238 |
| 8,078,620 | B2 * | 12/2011 | Dayon | 707/736 |
| 2010/0114912 | A1 * | 5/2010 | Hofhansl et al. | 707/749 |
| 2010/0185593 | A1 * | 7/2010 | Wong et al. | 707/684 |
| 2010/0250565 | A1 * | 9/2010 | Tobin et al. | 707/756 |
| 2010/0299663 | A1 * | 11/2010 | Weissman et al. | 717/170 |
| 2010/0299664 | A1 * | 11/2010 | Taylor et al. | 717/173 |
| 2011/0246417 | A1 * | 10/2011 | Maya et al. | 707/610 |
| 2011/0246434 | A1 * | 10/2011 | Cheenath et al. | 707/703 |

(Continued)

*Primary Examiner* — Kamini Patel
(74) *Attorney, Agent, or Firm* — Ingrassia Fisher & Lorenz, P.C.

(57) ABSTRACT

A method for identifying errors in code is provided. The method may include rebuilding object dependencies from a heap dump, calculating memory usage of each object, identifying top consumers of memory by object class, analyzing how much memory each class consumes with respect to how much other classes consume, building a corpus of data that may be used in a progressive machine learning algorithm, and identifying suspect classes. Additionally, the suspect classes and the memory usage statistics of the suspect classes may then be used as an identifying signature of the associated out of memory error. The identifying signature of the associated out of memory error may then be used to compare with the signatures of other out of memory occurrences for identifying duplicate error occurrences.

18 Claims, 7 Drawing Sheets

(56) References Cited

U.S. PATENT DOCUMENTS

| | | | |
|---|---|---|---|
| 2011/0246435 A1* | 10/2011 | Wu et al. | 707/704 |
| 2011/0258603 A1* | 10/2011 | Wisnovsky et al. | 717/125 |
| 2011/0276610 A1* | 11/2011 | Hossain et al. | 707/813 |
| 2011/0282899 A1* | 11/2011 | Mathew et al. | 707/769 |
| 2011/0283163 A1* | 11/2011 | Zheng | 714/763 |
| 2011/0283266 A1* | 11/2011 | Gallagher et al. | 717/130 |
| 2011/0289356 A1* | 11/2011 | Hossain et al. | 714/38.1 |
| 2011/0302135 A1* | 12/2011 | Prophete et al. | 707/634 |
| 2011/0302256 A1* | 12/2011 | Sureshchandra et al. | 709/206 |
| 2011/0302454 A1* | 12/2011 | Prophete et al. | 714/38.1 |
| 2011/0302479 A1* | 12/2011 | Movida et al. | 714/798 |
| 2011/0314341 A1* | 12/2011 | Varadharajan | 714/38.1 |
| 2012/0011406 A1* | 1/2012 | Williams et al. | 714/38.14 |
| 2012/0041886 A1* | 2/2012 | Williams et al. | 705/317 |
| 2012/0042218 A1* | 2/2012 | Cinarkaya et al. | 714/57 |
| 2012/0054250 A1* | 3/2012 | Williams et al. | 707/803 |
| 2012/0072783 A1* | 3/2012 | Li et al. | 714/57 |
| 2012/0078981 A1* | 3/2012 | Gradin et al. | 707/812 |
| 2012/0089610 A1* | 4/2012 | Agrawal et al. | 707/741 |
| 2012/0143837 A1* | 6/2012 | Roy-Faderman et al. | 707/702 |
| 2012/0144024 A1* | 6/2012 | Lee | 709/224 |
| 2012/0198279 A1* | 8/2012 | Schroeder | 714/32 |
| 2012/0221603 A1* | 8/2012 | Kothule et al. | 707/783 |
| 2012/0259894 A1* | 10/2012 | Varley et al. | 707/795 |
| 2013/0019106 A1* | 1/2013 | Fischer | 713/189 |
| 2013/0031053 A1* | 1/2013 | Tobin et al. | 707/635 |

* cited by examiner

US 9,201,760 B2

METHOD AND SYSTEM FOR IDENTIFYING ERRORS IN CODE

CLAIM OF PRIORITY

This application is a continuation of U.S. Utility patent application Ser. No. 13/105,849, entitled METHOD AND SYSTEM FOR IDENTIFYING ERRORS IN CODE, by Zuye Zheng, filed May 11, 2011, which claims the benefit of U.S. Provisional Patent Application 61/395,407, entitled METHOD AND SYSTEM FOR IDENTIFYING ERRORS IN CODE, by Zuye Zheng, filed May 12, 2010, and the contents of all of the above listed applications are incorporated herein by reference, in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending or other United States patents and Patent Applications, including the present application, are related to each other. Each of the other patents/applications listed below are incorporated by reference herein in its entirety:

U.S. Provisional Patent Application 61/395,407 entitled Method and System for Identifying Errors in Code, by Zuye Zheng, filed May 12, 2010, and U.S. Utility patent application Ser. No. 13/105,849 entitled Method and System for Identifying Errors in Code, by Zuye Zheng, filed May 11, 2011.

FIELD OF THE INVENTION

One or more implementations relate generally to computer systems and more specifically to debugging software.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. In conventional software debugging, software developers use a variety of tools to browse, inspect, and analyze heap dumps.

In general, a heap dump is a snapshot of all the live objects and classes in the system memory at a particular point in time. The ability to load and view heap dumps and recreate the object dependencies and analyze classes and objects for memory usage may allow software developers to debug system crashes due to memory shortage errors and determine application memory footprints, among other things.

However, in a cloud computing environment with numerous application servers running constantly, processing each heap dump manually is a tedious and time consuming task that is not practical. Furthermore, due to the nature of cloud computing architectures, a single problem can be propagated to numerous application servers, causing numerous heap dumps of the same issue (duplication). Developers want to be able to efficiently identify, analyze, and debug errors in heap dumps.

Accordingly, it may be desirable to provide techniques enabling the automatic identification of errors in code.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
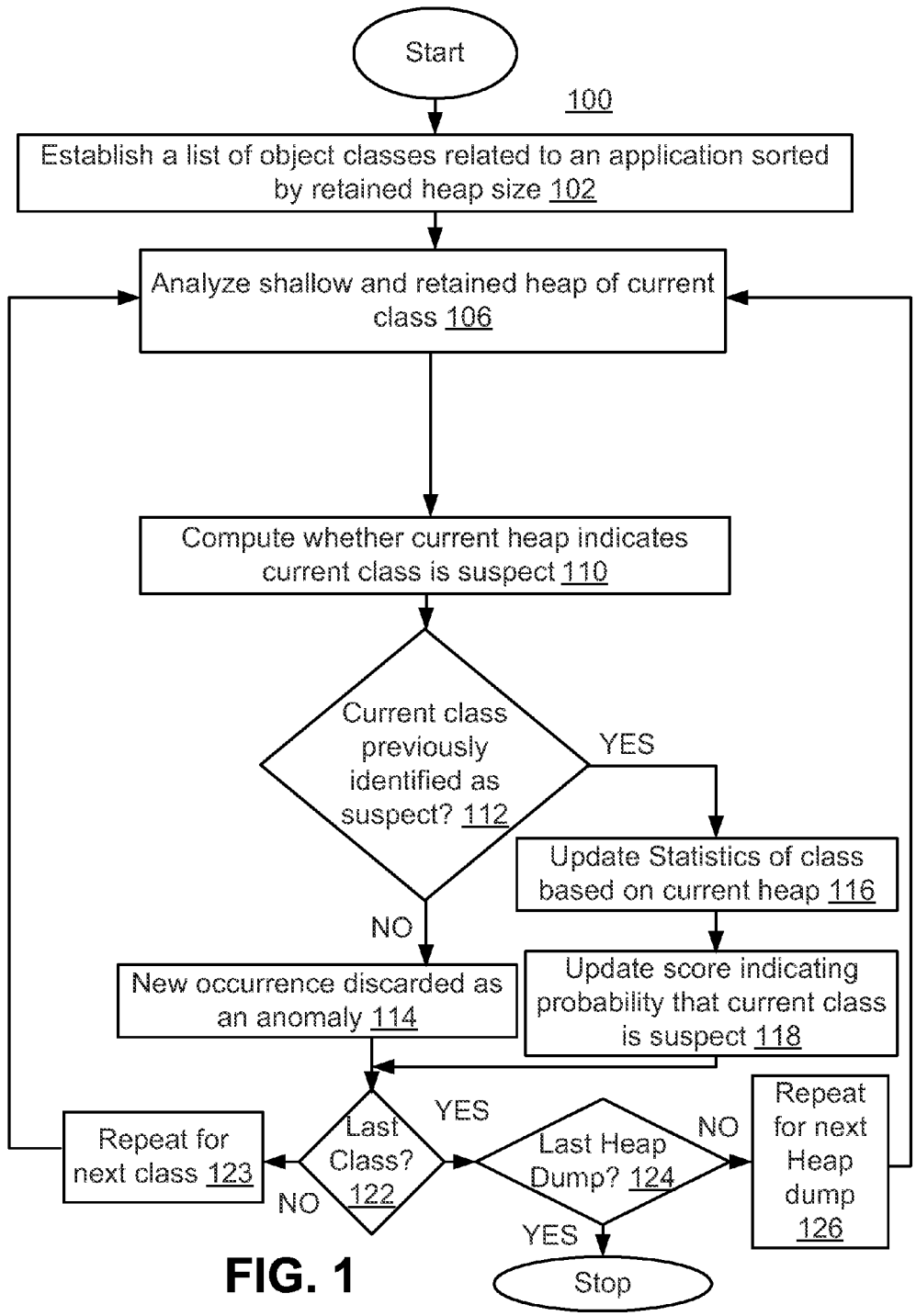
FIG. 1 shows a flowchart of examples of a method for identifying errors that are suspected to have been caused by being out-of-memory.

Systems and methods are provided for identifying errors in code. These mechanisms and methods for identifying errors in code can enable embodiments to automatically process and analyze heap dumps. The ability of embodiments to automatically process and analyze heaps dumps can enable automatically identifying suspect classes and possible duplicate out of memory error occurrences using machine learning.

In at least one embodiment and by way of example, a method for identifying errors in code is provided. The method may include rebuilding object dependencies from a heap dump, calculating memory usage of each object, identifying top consumers of memory by object class, analyzing how much memory each class consumes with respect to how much other classes consume, building a corpus of data that may be used in a progressive machine learning algorithm, and identifying suspect classes that are suspected of causing out of memory issues (optionally, in addition, other memory usage issues may be identified). Additionally, the suspect classes and the memory usage statistics of the suspect classes may then be used as an identifying signature of the associated out of memory error. The signature of the out of memory error may include statistics about each suspect class such as the retained and shallow heap, object count, which objects were loaded into active memory at the time of the heap dump, and the occurrence index (as indicated by the heap dump performed upon the indication of the out of memory error. The identifying signature of the associated out of memory error may then be used to compare with the signatures of other out of memory occurrences for identifying duplicate error occurrences.

While embodiments of techniques for identifying errors in code may be implemented in a system having an application server providing a front end for an on-demand database service capable of supporting multiple tenants, the embodiments are not limited to multi-tenant databases, are not limited to databases, and are not limited to deployment on application servers. Embodiments may be practiced using other database architectures, i.e., ORACLE®, DB2® by IBM, or no database, without departing from the scope of the embodiments claimed.

Heap Dump Memory Usage Analysis

In at least one embodiment, heap dump memory analysis may be performed by rebuilding some or all object and primitive dependencies in a heap dump, such as a Java hprof (a heap/CPU profiling tool) binary heap dump or other heap profiling tool.

In an embodiment using the heap profiling tool, the profiling tool may provide a command line, may be a native agent library of a virtual machine (e.g., a JAVA Virtual Machine or JVM) that is dynamically loaded through a command line option, at the startup of the virtual machine, which may become part of the virtual machine process, thereby allowing users to request various types of heap and/or CPU profiling features from the profiling tool. In an embodiment, the data generated by the heap profiling tool may be provided in textual or binary format, and may facilitate the tracking down and isolation of performance problems involving memory usage and inefficient code. The binary format file from the heap profiling tool may be used with heap analysis tool, such as JAVA's Heap Analysis Tool (HAT) to browse the allocated objects in the heap. Java hprof is a command line profiling tool for heap and central processing unit (CPU) profiling. It is noted that in other embodiments, any other profiling routine that is capable of profiling heap dumps or binary heap dumps may be used instead of hprof. After rebuilding and remapping the dependencies, the heap profiling tool may then analyze each object for memory usage statistics, such as the shallow heap and retained heap by traversing the dependency trees of the heap dump. The shallow heap is the memory usage of one object. The retained heap of an object is the memory usage of one object plus the memory usage of all objects to which the object has access to. The shallow heap is the memory usage of an object may include the memory required to store some or all of the primitive values of the object along with the size of the pointers to other objects, but not the actual size in memory of those objects. The retained heap usage of an object may include the memory required to store all of the primitive values of the object along with the pointer size and retained heap usage of each object the object (for which the retained heap was created) points to, with the caveat that the retained heap usage of any child object may only be accounted for once in the final calculation of memory usage.

In at least one embodiment, the shallow and retained heaps may be grouped together by class to calculate the shallow and retained heaps of entire classes along with the number of objects created for each class. In embodiments, the heap dumps may be analyzed for memory leaks or classes that have excessive memory usage. A memory leak may occur when memory that is no longer in use is not freed. Although not necessarily a memory leak, an object that allocates large amounts of memory, which may in fact be nominally in use, but does no need to be kept in use is also a problem that the memory usage analysis may identify. The classes that caused the out of memory occurrence may have the highest shallow and/or retained heaps.

Statistical Analysis for Suspect Identification

In at least one embodiment, in order to identify errors that are suspected to have caused an out-of-memory error (which may be referred to as out-of-memory suspects), all of the object classes related to an application may be sorted by retained heap size. Using the list of object classes sorted by retained heap sizes, the top N classes may be considered, where N may be determined by the nature of the application that generated the heap dump, as anything below these top N classes may be very unlikely to have caused the out of memory error, because the classes below the top N may not have used enough memory to cause an error. Also, the classes below this cutoff (that is below the top N classes) may use significantly less memory than the top N classes and have very similar shallow and retained heap size as compared to differences in the top N classes and thus may only be noise in suspect identification.

In at least one embodiment with the use of the top N classes of several heap dumps, generated during the running of the same application, a debugger may build a corpus or body of data to detect anomalies that are suspects in causing the out of memory occurrences during the running of that application. In the first few heap dumps, the sorting by size may produce inaccurate suspect identifications as the corpus of data is built, but may be instructive in learning what may be normal and what may be anomalies. However, with more data in the form of heap dumps gained from further application runs, the debugger may learn and be able to more accurately identify suspects through a scoring system based on the sorting.

In at least one embodiment, a scoring system may be based on the mean and standard deviation of the size of the shallow heap and retained heap, number of objects, and an occurrence index in the top N classes of each class across all heap dumps. In an embodiment given a new heap dump and class C in the top N classes, the debugger may query all past heap dumps for the occurrence of class C, where class C is not identified as the suspect in that heap dump. If the class C is not found in any previous head dump analysis, the class C is an anomaly. If the class C has been found in previous analyzed heap dumps, then statistics including, the mean and standard deviation of the shallow and retained heap, number of objects, and occurrence index are calculated for all previous occurrences of class C. Using the statistics calculated for previous occurrences of class C, the probability that class C is a suspect may be calculated by an equally weighted probability of the likelihood of each statistic of class C given the historical mean and standard deviation. In embodiments a scoring system may equally weight these statistics to reduce noise from non-significant anomalies. This probability may then be the score of class C such that the higher the score, the higher the probability that C is a suspect (other forms of scoring could be used instead, such as the lower the score the higher the probability that C is a suspect). A score may be calculated for each class in the top N classes of a heap dump. In at least one embodiment, with the calculated scores, a threshold may be determined by the nature of the application that is the source of the heap dump to identify suspects in a heap dump automatically.

FIG. 1 shows a flowchart of an example of a method 100 for identifying errors that are suspected to have been caused by being out-of-memory that may be used in large, clusters of application servers in a cloud based computing environments. In step 102, a list of the object classes having the largest retained heap sizes that are related to an application sorted by retained heap size. Optionally, in step 102 a number of heap dumps are analyzed to establish a body of data so that anomalies in the data (e.g., one type of anomaly may be a lone heap dump that indicates that a particular class is suspect). In step 104, a particular shallow, retained heap, and other information is analyzed for a particular class. In step 106, the top N classes are analyzed from each of the lists. In step 108, a score is assigned to each object of the top N object, based on the mean and standard deviation of the shallow heap and retained heap, number of objects, and occurrence index in the top N classes of each class across all heap dumps. In step 110, a determination is made as to whether the current heap dump contains anomalous results. Step 110 may involve querying the past heap dumps that formed the scoring system for the current class determining whether the information derived for the class from current heap dump is consistent with prior heap dumps, such as whether the current heap dump is the only heap dump to indicate that the current class is suspect. In step 112, if the heap dump indicates that the current class is suspect and if the current class has not previously been identified as a suspect (i.e., class C is not found in any previous head dump analysis) then the method proceeds to step 114 where the new occurrence of the class C is considered an anomaly. However in step 112, (1) if the current heap dump does not indicate that the current class is suspect or (2) if the current heap dump indicates that the current class is suspect and if the current class is found in a previous head dump analysis to be suspect, then in the method proceeds to step 116 where statistics for the current class are updated based on the current heap dump. The statistics may include the mean and standard deviation of the shallow and retained heap, the number of objects referenced by the current class in the heap dump, and the occurrence index for the current class. Optionally, the statistics of the current heap dump and the updates to the statistics could be computed in step 106 or 110, and saved in step 116 or could be first computed in step 116, while in steps 106 and 110 only some preliminary computations are performed to determine if the current heap dump indicates that the current class is suspect or otherwise inconsistent with prior heap dumps. In step 118, a score, or an update to the score, that indicates the probability that the current class is suspect is computed based on the statistics. In updating the score or computing the score, each statistic of the current class is equally weighted. After step 114 or 118, method 100 proceeds to step 122, to determine whether the current class is the last class to be considered in the heap dump. If the current class is not the last class, then the method proceeds to step 123, where an index for which class to consider may be incremented to the next class, heap data for the next class may be retrieved, and method 100 returns to step 106, which is applied to the heap date of the next class. If the current class is the next class, then the method proceeds to step 124, to determine whether the current heap dump is the last heap dump to consider, if the current heap dump is not the last heap dump to consider, then an index for the heap dump being considered may be incremented, the index for the class to consider may be set an initial value (e.g., 1), the heap data for the first class in the next heap dump is retrieved, method 100 returns to step 106, which is repeated for the first class of the next heap dump (which resulted from the next out of memory error. In step 126, if there is another heap dump to consider, the process is repeated. If there are no more heap dumps to consider, then method 100 terminates and presents results to the user, which in an embodiment may include a list of the classes with the largest average retained heaps, a score indicative of the likelihood that the class is a root cause of out of memory errors, and an indication as whether the score is on the side of the threshold that indicates that the class is a cause of the out of memory error.

In at least one embodiment, each of the steps of method 100 is a distinct step. In another embodiment, although depicted as distinct steps in FIG. 1, step 102-126 may not be distinct steps. In other embodiments, method 100 may not have all of the above steps and/or may have other steps in addition to or instead of those listed above. The steps of method 100 may be performed in another order. Subsets of the steps listed above as part of method 100 may be used to form their own method.

Identification of Duplicate Out of Memory Occurrences with Suspect Identification In at least one embodiment, the suspect identification scores may be utilized to further analyze heap dumps to look for heap dumps with a similar suspect signature to identify duplicate out of memory occurrences. The suspect signature of a specific heap dump may be the suspects identified through suspect identification along with statistics about each suspect class such as the retained and shallow heap, object count, and occurrence index.

In at least one embodiment, a scoring system may be utilized to calculate the probability that a new occurrence of an out of memory is a duplicate by first finding other out of memory occurrences with matching or very similar suspect classes. If no occurrence with a similar signature is found then the out of memory occurrence is probably not a duplicate. If similar occurrences are found, the similar occurrences are first grouped in sets by whether there are any duplicates. The averages and standard deviations of sets with multiple duplicates may then be calculated and scored with the new occurrence. The out of memory occurrences without duplicates may be directly scored with the new occurrence substituting the matching occurrences actual statistics as the averages and a pre-determined default standard deviation as the standard deviation of the set. In at least one embodiment, with the duplication scores, a threshold may be determined by the nature of the application that is the source of the heap dump to identify duplicate out of memory occurrences automatically.

Figure 2:
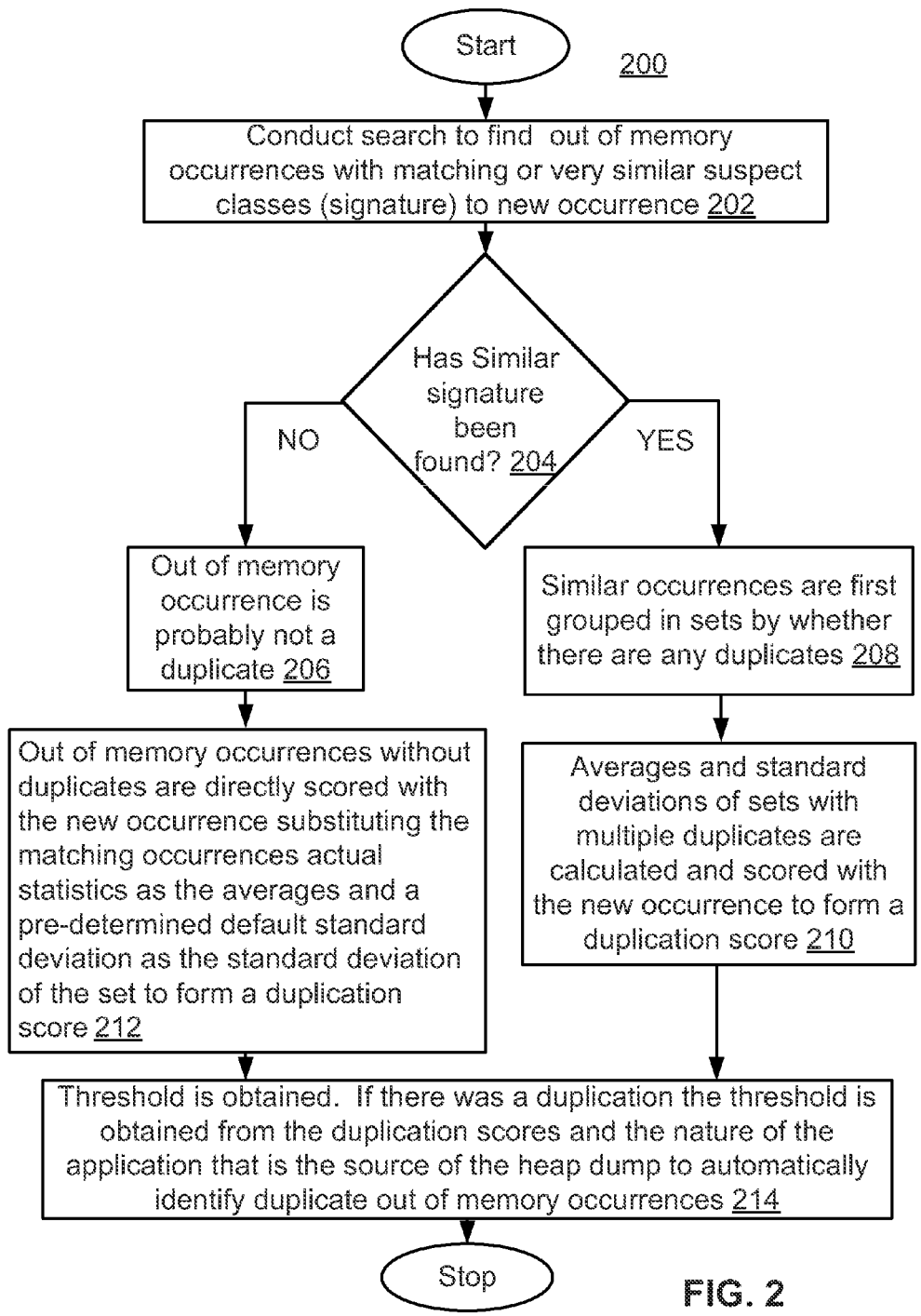
FIG. 2 shows a flowchart of examples of a method that utilizes suspect identification scores to analyze heap dumps to look for heap dumps with a similar suspect signature to identify duplicate out of memory occurrences.

FIG. 2 shows a flowchart of an example of a method 200 that utilizes suspect identification scores to analyze heap dumps to look for heap dumps with a similar suspect signature to identify duplicate out of memory occurrences. Method 200 may be performed as part of method 100, such as while gathering the body of data to which new heap dumps may be compared and/or while computing the update to the score in step 116 and/or 118. In step 202, a search is conducted to find other out of memory occurrences with matching or very similar suspect classes to a new occurrence. Optionally, other factors of the signature may also be compared, such as statistics about each suspect class such as the retained and shallow heap, object count, and occurrence index. A score may be may be computed that is indicative as to whether a score an occurrence is a duplicate based on how similar the signatures are. If the score is one side of a threshold (e.g., above the threshold), the occurrence is treated as a duplicate and if the score is on the other side of the threshold (e.g., below the threshold), the occurrence is treated as not being a duplicate. In step 204, a determination is made as to whether a prior occurrence of the current out of memory error occurred or not, based on the search step 202. If no occurrence with a similar signature is found, then in step 206 it is determined that the out of memory occurrence is probably not a duplicate. If however in step 204 one or more out of memory occurrences with a similar signature are found, then in step 208 the similar occurrences are first grouped in sets by whether there are any duplicates. In step 210, the averages and standard deviations of sets with multiple duplicates are calculated and scored with the new occurrence to form a composite score for the set of duplicate occurrences. In step 212, out of memory occurrences without duplicates are directly scored with the new occurrence substituting the matching occurrences actual statistics as the averages and a pre-determined default standard deviation as the standard deviation of the set to form a duplication score. In other words, even though there are no duplicates of the current out or memory error, a default standard deviation is used as a guess as to what the standard deviation would be, were there duplicate occurrences of the current out of memory error. In step 214, a threshold is obtained from the duplication scores and the nature of the application that is the source of the heap dump, which is used to automatically identify duplicate out of memory occurrences. In an embodiment, regarding the nature of the application, although the threshold is determined automatically, some of the factors that determine the threshold may include phenomenological constants that are set by the user, based on experience and/or statistical considerations on other applications and/or systems.

In at least one embodiment, each of the steps of method 200 is a distinct step. In another embodiment, although depicted as distinct steps in FIG. 2, steps 202-214 may not be distinct steps. In other embodiments, method 200 may not have all of the above steps and/or may have other steps in addition to or instead of those listed above. The steps of method 200 may be performed in another order. Subsets of the steps listed above as part of method 200 may be used to form their own method.

System Process Space

Figure 3:
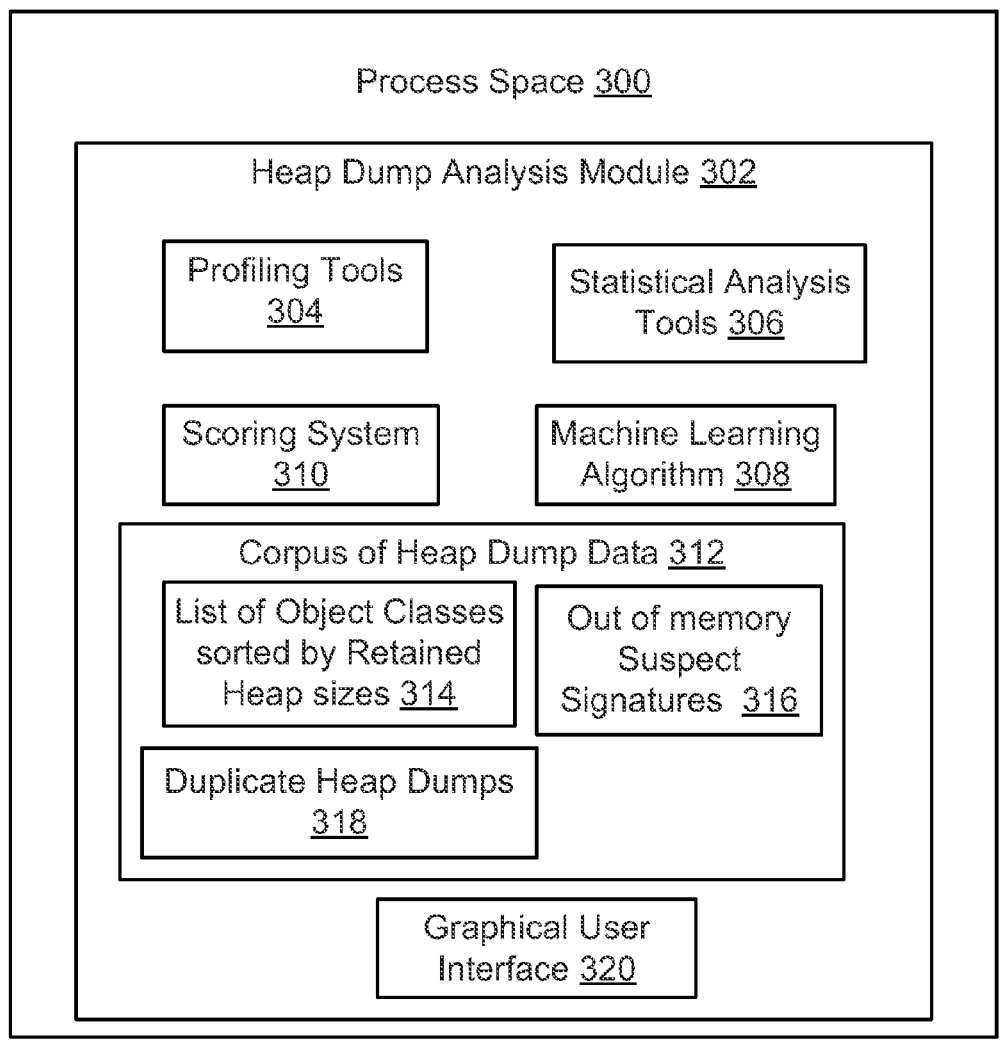
FIG. 3 shows a block diagram of an embodiment of tools for analyzing heap dumps in a multi-tenant database network system.

FIG. 3 shows a block diagram of an embodiment of process space 300. Process space 300 may include heap dump analysis module 302, profiling tools 304, statistical analysis tools 306, machine learning algorithm 308, system scoring 310, corpus of heap dump data 312, list of object classes sorted by retained heap sizes 314, out of memory suspect signatures 316, duplicate heap dumps 318, and graphical user interface 320. In other embodiments, tenant process space 300 may not have all of the elements listed and/or may have other elements instead of or in addition to those listed.

Process space 300 is the portion of the system where various programs for running the system reside, which is discussed further in below conjunction with FIGS. 4 and 5. Heap dump analysis module 302 may automatically process and analyze heap dumps and may enable the automatic identification of suspect classes and possible duplicate out of memory error occurrences using machine learning. Profiling tools 304 may analyze each object for memory usage statistics, such as the shallow heap and retained heap by traversing through dependency trees of the heap dump. Statistical analysis tools 306 may perform the statistical calculations for heap dump analysis. Statistical analysis tool may compute the mean and standard deviations of the size of the shallow and retained heaps for each of the classes having the largest retained heaps. Machine learning algorithm 308 may identify suspect classes and identify duplicate out of memory occurrences automatically based on analysis of a sufficient corpus of heap dumps. As the corpus of heap dumps grows, the mean and standard deviations of the size of the shallow and retained heaps become more accurate, so that suspect classes can be identified more reliably. Also, as the corpus of heap dumps grows and as more memory leaks confirmed by inspecting the code and finding the programming error generating the leak, the appropriate values for the parameter that determine the thresholds may be more accurately determined. Scoring system 310 computes a score that is indicative of the class's probability of being an out of memory suspect and/or a second score that is indicative of a probability of an out of memory occurrence being a duplicate occurrence. Corpus of heap dump data 312 is a database of past analyzed heap dumps that is retained to assist in the identification of new and duplicate occurrences of out of memory errors. The list of object classes sorted by retained heap sizes 314, lists the object classes related to an application that may be sorted by retained heap size. Using the list of object classes sorted by retained heap sizes 314, the top N classes may be considered as the primary suspects of being causes of the root out of memory errors. Out of memory suspect signatures 316 may be used to identify duplicate out of memory occurrences. Duplicate heap dumps 318 are sets of heap dumps in which each set includes a collection of heap dumps with similar suspect signatures that may have been identified as being duplicate out of memory occurrences with respect to the other heap dumps in the same set. Duplicate heap dumps 318 may be searched to determine whether a new occurrence of an out of memory error is a duplicate of a prior out of memory error. Graphical user interface 320 may be used to present users, such as software or application developers, with analysis information to debug system crashes due to memory shortage errors and determine application memory footprints, among other things.

System Overview

Figure 4:
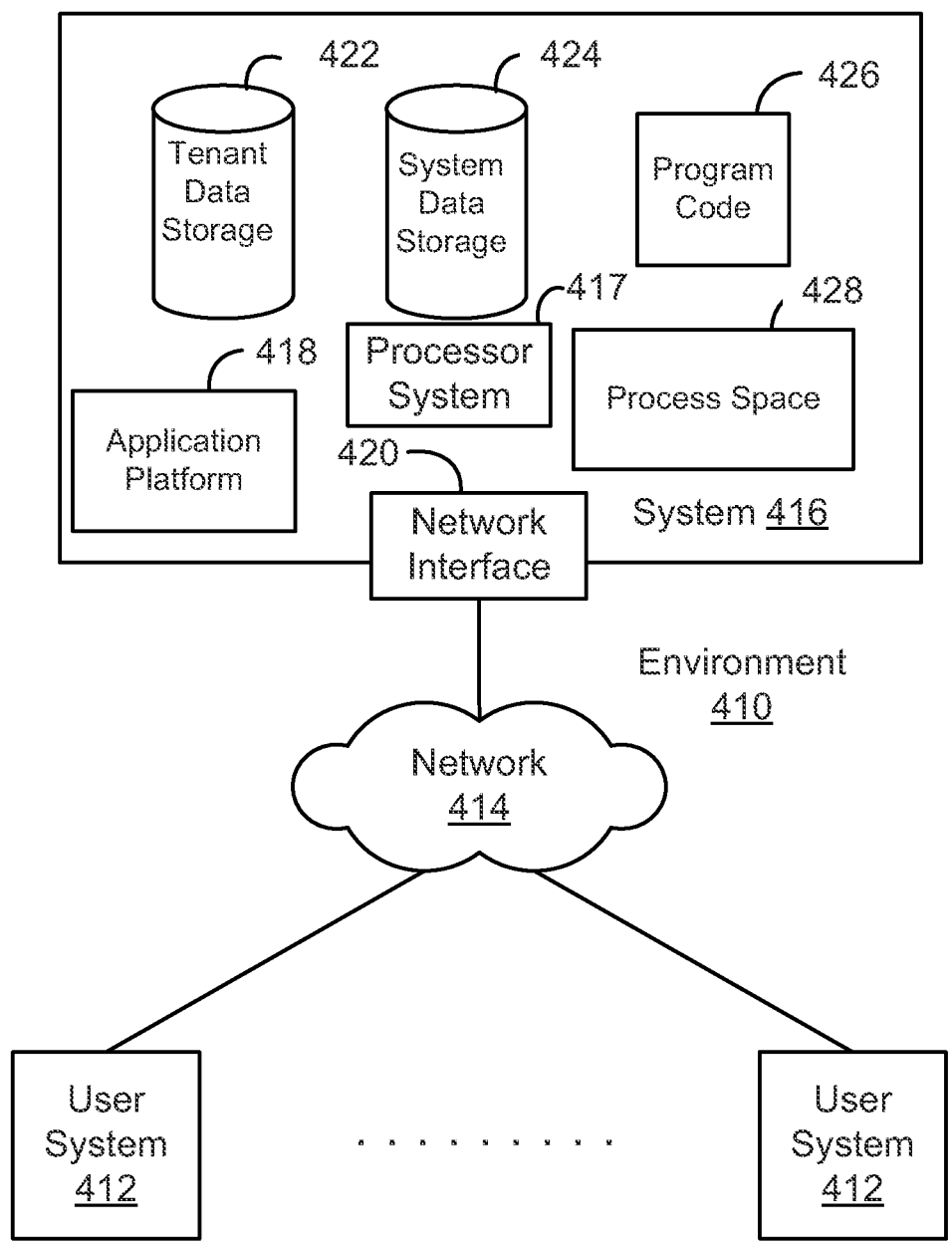
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be anyone or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
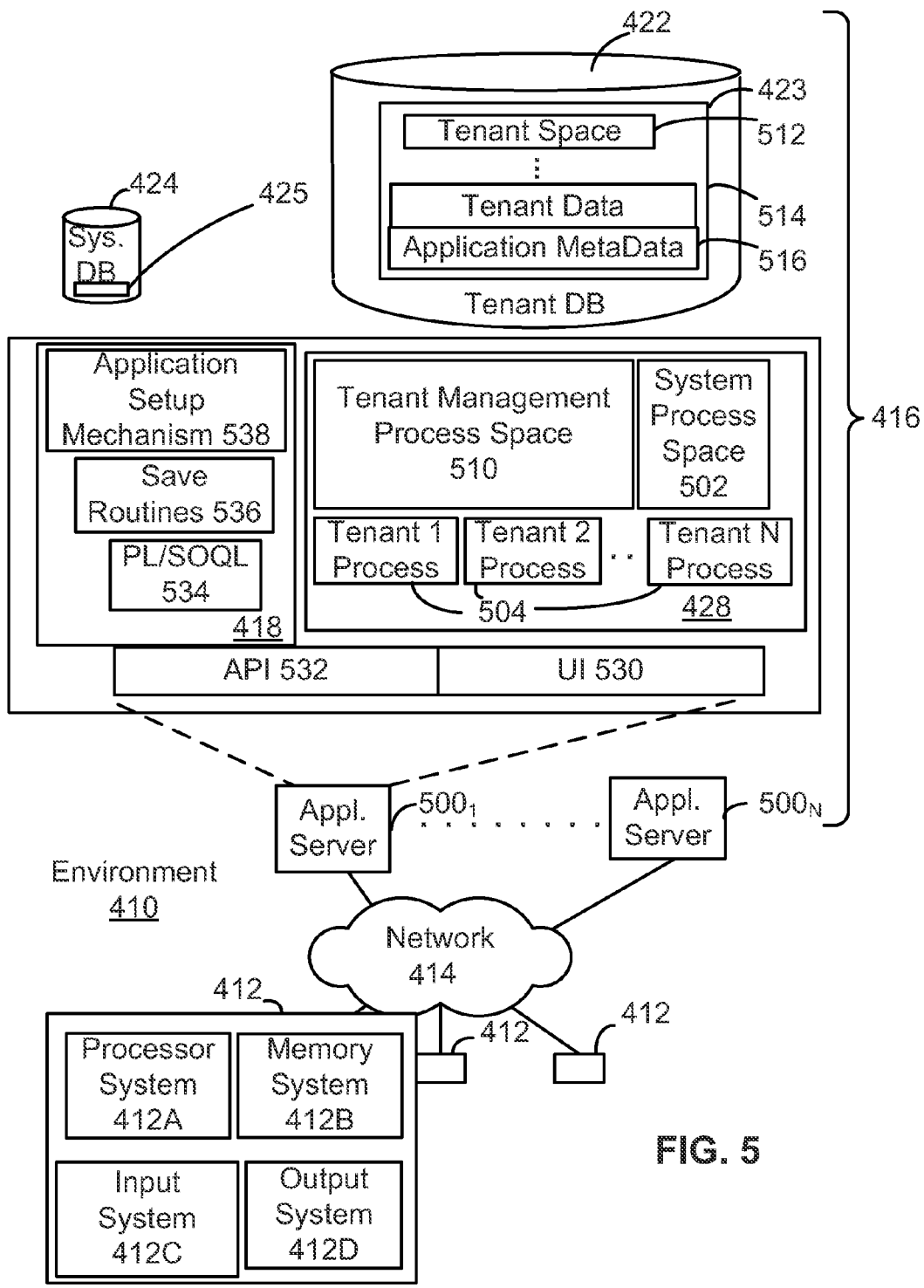
FIG. 5 illustrates a block diagram of an embodiment of elements of FIG. 4 and various possible interconnections between these elements.

One arrangement for elements of system 416 is shown in FIG. 4 and FIG. 5, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes. Process space 300 may be an embodiment of process space 428.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 428, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server 5001 might be coupled via the network 414 (e.g., the Internet), another application server 500N-1 might be coupled via a direct network link, and another application server SOON might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In at least one embodiment, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 4 and 5)

Figure 6:
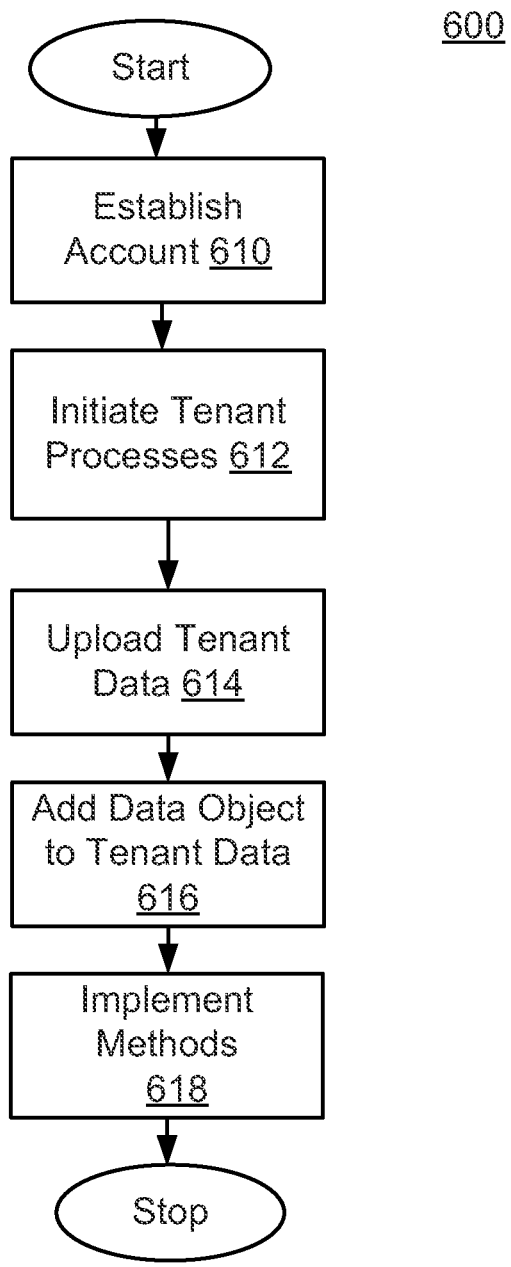
FIG. 6 illustrates a flowchart of an embodiment of a method of using the environment of FIGS. 4 and 5.

FIG. 6 shows a flowchart of an example of a method 600 of using environment 410. In step 610, user system 412 (FIGS. 4 and 5) establishes an account. In step 612, one more tenant process spaces 504 (FIG. 5) are initiated on behalf of user system 412, which may also involve setting aside space in tenant space 512 (FIG. 5) and tenant data 514 (FIG. 5) for user system 412. Step 612 may also involve modifying application metadata to accommodate user system 412. In step 614, user system 412 uploads data. In step 616, one or more data objects are added to tenant data 514 where the uploaded data is stored. In step 618, methods and the code for identifying errors in code for large, clustered application server based cloud computing environments associated with FIGS. 4 and 5 may be implemented. The user of method 600 may represent an organization that is a tenant of system 416 (FIG. 4) or may be associated with the tenant. In an embodiment, each of the steps of method 600 is a distinct step. In another embodiment, although depicted as distinct steps in FIG. 6, steps 610-618 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Method for Creating the Environment (FIGS. 4 and 5)

Figure 7:
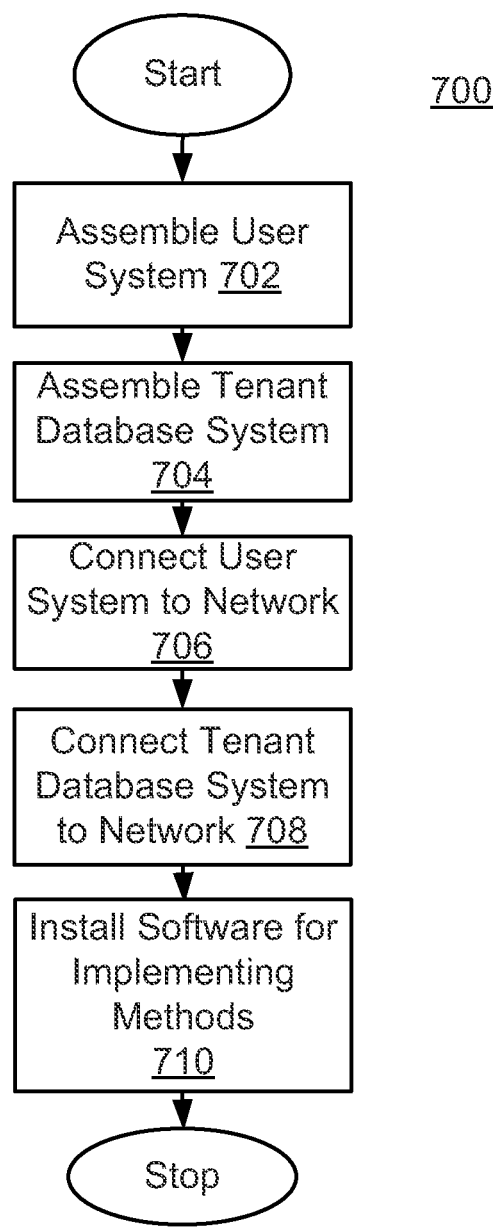
FIG. 7 illustrates a flowchart of a method of making the environment of FIGS. 4 and 5.

FIG. 7 is a method of making environment 410, in step 702, user system 412 (FIGS. 4 and 5) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 704, system 416 (FIGS. 4 and 5) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 416 may include installing application platform 418, network interface 420, tenant data storage 422, system data storage 424, system data 425, program code 426, process space 428, UI 530, API 532, PL/SOQL 534, save routine 536, application setup mechanism 538, applications servers 500$_1$-500$_N$, system process space 502, tenant process spaces 504, tenant management process space 510, tenant space 512, tenant data 514, and application metadata 516 (FIG. 5).

In step 706, user system 412 is communicatively coupled to network 414. In step 708, system 416 is communicatively coupled to network 414 allowing user system 412 and system 416 to communicate with one another (FIG. 5). In step 710, one or more instructions may be installed in system 416 (e.g., the instructions may be installed on one or more machine readable media, such as computer readable media, therein) and/or system 416 is otherwise configured for performing the steps of methods and generating sampling and profiling tools for large, clustered application server based cloud computing environments. For example, as part of step 710, one or more instructions may be entered into the memory of system 416 for identifying errors in code for large, clustered application server based cloud computing environments, such as multi-tenant on-demand systems. In an embodiment, each of the steps of method 700 is a distinct step. In another embodiment, although depicted as distinct steps in FIG. 7, steps 702-710 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

ALTERNATIVES AND EXTENSIONS

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for identifying errors in software code in a multi-tenant environment comprising:
    calculating, by a host system, memory usage statistics of each of a group of objects that contributed to a current heap dump, the host system including a set of one or more processors and a memory system including one or more computer readable media by the set of one or more processors;
    identifying, by the host system, top consumers of memory by object of the current heap dump;
    determining, by the host system, how much memory a given one of the top consumers consumes with respect to how much memory top consumers other than the given one of the top consumers consume;
    computing, by the host system, a suspect score based on the determining; and
    determining, by the host system, whether the given one of the top consumers is likely to have caused memory issues based on the suspect score.

2. The method of claim 1, further comprising:
    building a corpus of data for identifying suspect classes that are responsible for out of memory errors; and
    identifying a signature of an associated out of memory error based on at least the suspect classes and the memory usage statistics.

3. The method of claim 2, where the object classes related to an application are sorted by retained heap size into a list;
    where a set of top memory consumers, which are a subset of the object classes on the list, which does not include all of the objects classes on the list, are used in building a corpus of data.

4. The method of claim 1, further comprising:
    calculating memory usage statistics, the calculating including at least determining a shallow heap; and
    determining retained heap usages by traversing through dependency trees of the heap dump.

5. The method of claim 4, the determining of the shallow heap includes at least determining primitive values and sizes of the pointers to other objects.

6. The method of claim 4, where the shallow and retained heaps are grouped together by class to calculate the shallow and retained heaps of entire classes along with the number of objects created for each class; and
    where each class is analyzed for memory leaks or excessive memory usage.

7. The method of claim 1, where the suspect score is based on a mean and standard deviation of a shallow heap size and a retained heap size, a number representing how many objects are referenced by the current class, and an occurrence index value representing a relative size of the retained heap of the current class of the given one of the top consumers with respect to top consumers other than the given one of the top consumers, the score being computed based on a multiplicity of heap dumps stored.

8. The method of claim 1, further comprising:
    comparing a signature of the current heap dump associated with an out of memory error with a series of signatures of other heap dumps associated with other out of memory occurrences; and
    determining whether the current heap dump is a duplicate or an earlier occurrence.

9. The method of claim 8, further comprising:
    computing, based on the comparing of the signatures, a duplication score that is indicative of a probability that the current heap dump is a duplicate of a prior heap dump;
    if no occurrence with a similar signature is found then the out of memory error is not considered a duplicate, the computing of the suspect score is performed;
    if a similar occurrence is found, including the current heap dump in a set of duplicates of the current heap dump;

computing averages and standard deviations of sizes of shallow and retained heaps of the top consuming classes; and computing the suspect score for the set with the new heap dump, by the set of one or more processors.

10. The method claim 1, further comprising:

rebuilding, at the host system, object dependencies from a current heap dump.

11. The method of claim 1, the host system having a plurality of servers on which the objects run.

12. The method of claim 11, the host system being a multitenant relational database, and the plurality of sever run copies of a database server for the multitenant relational database.

13. The method of claim 1, further comprising:

searching, by the host system, prior heap dumps for heap dumps that are similar to the current heap dump.

14. The method of claim 13, further comprising:

if a prior heap dump is found that is similar, grouping, by the host system, the prior heap dump together with the current heap dump in a set of similar heap dumps; and associating information about the set of heap dumps with the current heap dump.

15. The method of claim 14, the computing of the suspect score for each of the top consumers being based on information about the set of heap dumps.

16. The method of claim 14, the computing of the suspect score for each of the top consumers being performed if a prior similar heap was found for the given one of the top consumers.

17. The method of claim 1, the computing of the suspect score being performed for each of the top consumers and being based on the information about memory usage if no prior similar heap dump was found.

18. A non-transitory machine-readable medium carrying one or more instructions for identifying errors in software code in a system, which when executed cause a method to be carried out, the method comprising:

calculating, by a host system, memory usage statistics of each of a group of objects that contributed to a current heap dump, the host system including a set of one or more processors and a memory system including one or more computer readable media by the set of one or more processors;

identifying, by the host system, top consumers of memory by object of the current heap dump;

determining, by the host system, how much memory a given one of the top consumers consumes with respect to how much memory top consumers other than the given one of the top consumers consume;

computing, by the host system, a suspect score based on the determining; and determining, by the host system, whether the given one of the top consumers is likely to have caused memory issues based on the suspect score.

* * * * *